United States Patent [19]

Terkovich

[11] Patent Number: 4,741,631

[45] Date of Patent: May 3, 1988

[54] ROTARY ENGINE INTERMEDIATE HOUSING BEARING SUPPORT ASSEMBLY

[75] Inventor: Branko A. Terkovich, Piscataway, N.J.

[73] Assignee: Deere & Company (John Deere Technologies, Inc.), Moline, Ill.

[21] Appl. No.: 28,506

[22] Filed: Mar. 20, 1987

[51] Int. Cl.[4] ............................................. F16C 23/02
[52] U.S. Cl. ...................................... 384/273; 384/434
[58] Field of Search ............... 384/271, 272, 273, 429, 384/432, 434, 428

[56] References Cited

U.S. PATENT DOCUMENTS

| | | | |
|---|---|---|---|
| 1,646,056 | 10/1927 | Evensen | 384/271 |
| 3,062,435 | 11/1962 | Bentele | 230/145 |
| 3,096,746 | 7/1963 | Sollinger | 123/8 |
| 3,193,187 | 7/1965 | Jones et al. | 230/145 |
| 3,240,423 | 3/1966 | Jones | 230/145 |
| 3,289,647 | 12/1966 | Turner et al. | 123/8 |
| 3,418,027 | 12/1968 | Asmanes | 384/271 |
| 3,694,113 | 9/1972 | Jones et al. | 418/60 |
| 3,791,235 | 2/1974 | Woodier et al. | 74/606 |

Primary Examiner—Lenard A. Footland

[57] ABSTRACT

A split bearing support receives a crankshaft bearing. When joined, the two bearing support parts form a hub with a frustoconical outer surface. The hub has a plurality of spaced-apart bolt holes extending axially therein. The bearing support is received by a housing which has a central opening surrounded by a frustoconical inner surface which mates with the outer surface of the bearing support hub. The bearing support and the housing are held together by a plurality of bracket segments which are attached to the side of the bearing support by bolts received in the bolt holes.

9 Claims, 1 Drawing Sheet

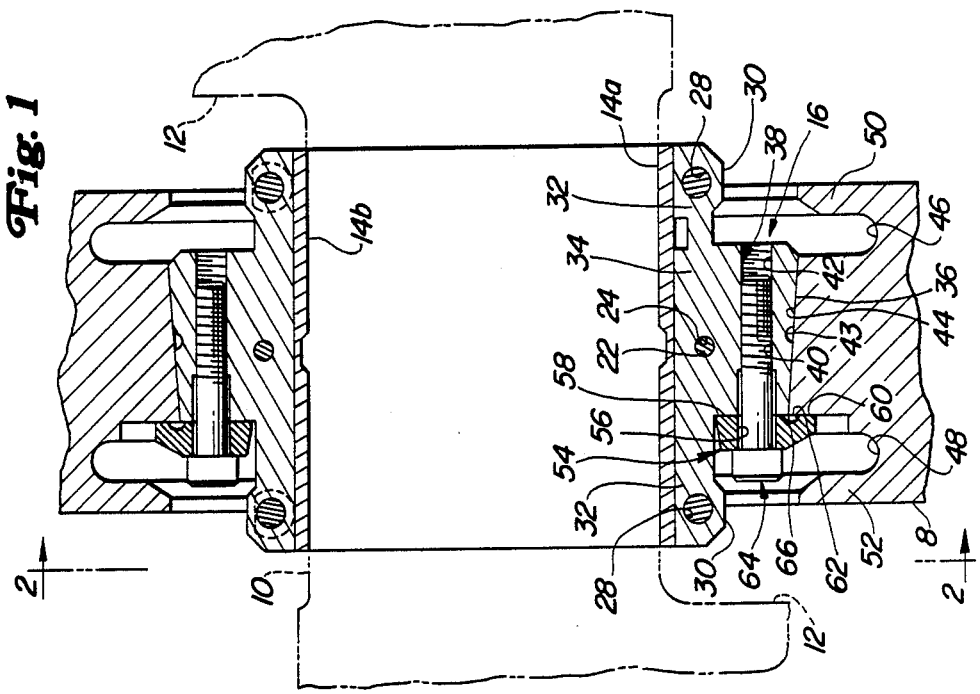

ROTARY ENGINE INTERMEDIATE HOUSING BEARING SUPPORT ASSEMBLY

BACKGROUND OF THE INVENTION

This invention was made with Government support under Contract No. N00024-85-C-5150 awarded by the United States Marine Corps. The Government has certain rights in this invention.

This invention relates to rotary mechanisms, such as pumps, fluid motors and internal combustion engines and, in particular, it relates to a multi-unit rotary internal combustion engine.

Conventional bearing support assemblies for the intermediate housings of multi-unit rotary engines are shown in U.S. Pat. No. 3,193,187, issued in 1965 to C. Jones et al and in U.S. Pat. No. 3,289,647 issued in 1966 to Turner et al. Such assemblies generally include the bearing support, wedged-shaped ring members, bolts and nut plates and/or retainers which engage the sides of the intermediate housing and the bearing support. Such assemblies have been expensive to manufacture due to the multiplicity of parts. Such assemblies have been difficult to assemble because of the large friction forces which result from the multiple frictionally engaging surfaces. Another problem is that during assembly, some of the wedge rings can advance further than others, resulting in an inaccurate final assembly. Also, after such an engine is disassembled for maintenance, each wedge ring would have to be marked and replaced in its original position during reassembly. Such assemblies have been difficult to assemble without damaging or deforming portions of the machined surface which must be accurately joined together in the assembled engine. Accordingly, it would be desirable to have such an assembly which has few parts and which can be assembled together without damage.

SUMMARY OF THE INVENTION

An object of the present invention is to provide a rotary engine intermediate housing bearing support assembly which has a reduced number of parts.

A further object of the present invention is to provide such an assembly which is simple to assemble without damaging the various parts.

Another object of the present invention is to provide such an assembly which is self-centering and self-locating.

These and other advantages are achieved by the present invention wherein a split bearing support receives a crankshaft bearing. When joined, the two bearing support parts form a hub with a frustoconical outer surface. The hub has a plurality of spaced-apart bolt holes extending axially therein. The bearing support is received by a housing which has a central opening surrounded by a frustoconical inner surface which mates with the outer surface of the bearing support hub. The bearing support and the housing are held together by a plurality of bracket segments which are attached to the side of the bearing support by bolts received in the bolt holes. Each bracket has a radially outer end face which engages a side surface of the housing and a radially inner end face which engages a side of the bearing support. These end faces are separated by a recess or groove which radially spans an area adjacent the joint between the frustoconical surfaces of the housing and the bearing support. The recess prevents the bracket from engaging the edge of the housing frustoconical surface as the parts are being assembled.

BRIEF DESCRIPTION OF THE DRAWINGS

FIG. 1 is a cross sectional view of a bearing support assembly constructed according to the present invention.

FIG. 2 is a view in the direction of arrows 2—2 of FIG. 1.

DETAILED DESCRIPTION

FIG. 1 shows a portion of a multi-unit rotary internal combustion engine including a portion of the intermediate housing 8, a one-piece rotatable engine cranskshaft 10 with eccentric portions 12 formed thereon for rotatably supporting conventional engine rotary pistons (not shown). Conventional split bearings 14a, 14b rotatably receive the shaft 10 and are, in turn, received by a generally annular bearing support 16 formed by bolting together a pair of bearing support portions 18 and 20. The portions 18 and 20 are coupled together by means of dowels 22 received in corresponding dowel bores 24 and by four bolts 26 which are received by bolt holes 28, one of which is shown via the cut-away portion of FIG. 2. The bolts 26 and bolt holes 28 are located in arc-shaped, built-up portions 30 of flanges 32 which extend axially from opposite sides of the support 16. The bearing support has a central hub 34 which has a frustoconical outer surface 36 which tapers from a large diameter end to a small diameter end. The bearing support also has a plurality of spaced-apart, axially extending attachment bores 238 extending axially through the hub 34. The bores 38 have a large diameter portion 40 and a smaller diameter threaded portion 42. An annular groove 43 surrounds the hub. Pressurized oil may be fed to the groove 43 to aid in disassembly of the bearing support from the housing.

The intermediate housing 8 has a central opening with a frustoconical inner surface 44 which tapers uniformly axially from a large diameter end to a small diameter end. On each side of the intermediate housing 8, there is an annular groove 46, 48 which at least is partially overhung by radially inwardly extending lips 50, 52.

The housing 8 and the bearing support 16 are coupled together by means of a plurality of arc-shaped bracket segments 54, each with a pair of bolt-rceiving bores 56 extending axially therethrough. Each bracket segment includes a radially inner axially facing end face 58 which engages the small diameter end of the hub 34 and a radially outer axially facing end face 60 which engages the intermediate housing adjacent the small diameter end of the tapered inner surface 44. End faces 58 and 60 are radially separated be a groove or recess 62. The brackets 54, and thus the intermediate housing 8, are attached to the bearing support 16 by means of bolts 64 which extend through bores 56 and are threadably received by bores 42 in bearing support 16. The groove 62 spans the joint between the bearing support surface 36 and the intermediate housing surface 44 at their smaller diameter ends and provides a clearance so that the brackets 54 do not engage the damage the circular edge or corner 66 of the intermediate housing 8 as the intermediate housing 8 is moved by brackets 54 fully onto the bearing support 16.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. In a multi-unit rotary mechanism having at least two rotors interconnnected by a generally uniform diameter shaft and having a housing with an opening through which the shaft extends, the housing also receiving a bearing support, the bearing support having a central opening for receiving a bearing which slidably engages the shaft, characterized by:

the housing having a frustoconical inner surface surrounding the housing opening;

the bearing support having a frustoconical outer surface for direct engagement with the housing inner surface and having a uniform diameter inner surface for direct engagement with an outer surface of the bearing;

a plurality of bracket members; and means for fastening the bracket members to the bearing support so that the bracket members engage the housing and hold the housing inner surface in mating engagement with the outer surface of the bearing support.

2. The invention of claim 1, wherein each bracket member comprises:

a curved body having a first axially facing end face engaging the housing and having a second axially facing end face engaging the bearing support, the first end face being spaced radially outwardly of the second end face.

3. The invention of claim 2, wherein the first and second end faces lie in a common plane.

4. The invention of claim 1, wherein the fastening means comprises:

a bolt extending through the bracket and threadably received in a bore in the bearing support.

5. In a multi-unit rotary mechanism having at least two rotors interconnected by a shaft and having a housing with an opening through which the shaft extends, the housing also receiving a bearing support, the bearing support having a central opening for receiving a bearing which slidably engages the shaft, characterized by:

the housing having a frustoconical outer surface;

a plurality of bracket members, each bracket member comprising a curved body having a first axially facing end face engaging the bearing support, the first end face being spaced radially outwardly of the second end face, the curved body of the support bracket having a recess therein separating the first and second end faces; and means for fastening the bracket members to the bearing support so that the bracket members engage the housing and hold the housing inner surface in mating engagement with the outer surface of the bearing support.

6. The invention of claim 5, wherein the recess prevents engagement of the bracket with an edge of the frustoconical inner surface of the housing.

7. The invention of claim 5, wherein the recess spans one end of a joint between the housing and the bearing support.

8. In a multi-unit rotary mechanism having at least two rotors interconnected by a shaft and having a housing with an opening through which the shaft extends, the housing also receiving a bearing support, the bearing support having a central opening for receiving a bearing which slidably engages the shaft, characterized by:

the housing having a frustoconical inner surface surrounding the housing opening;

the bearing support having a frustoconical outer surface;

a plurality of bracket members, each bracket member having a recess therein which spans an area adjacent to an end of a joint between the frustoconical outer and inner surfaces; and means for fastening the bracket members to the bearing support so that the bracket members engage the housing and hold the housing inner surface in mating engagement with the outer surface of the bearing support.

9. In a multi-unit rotary mechanism having at least two rotors interconnected by a shaft and having a housing with an opening through which the shaft extends, the housing also receiving a bearing support, the bearing support having a central opening for receivng a bearing which slidably engages the shaft, characterized by:

the housing having a frustoconical inner surface surrounding the housing opening;

the bearing support having a frustoconical outer surface;

a plurality of bracket members, each bracket member having a groove in a side of the bracket facing the housing, the groove being located so as to prevent engagement of the bracket with an edge of the frustoconical inner surface of the housing; and means for fastening the bracket members to the bearing support so that the bracket members engage the housing and hold the housing inner surface in mating engagement with the outer surface of the bearing support.

* * * * *